April 16, 1968 A. G. SEIPOS 3,377,638
CONVEYANCE LOADER
Filed Sept. 13, 1965 3 Sheets-Sheet 1
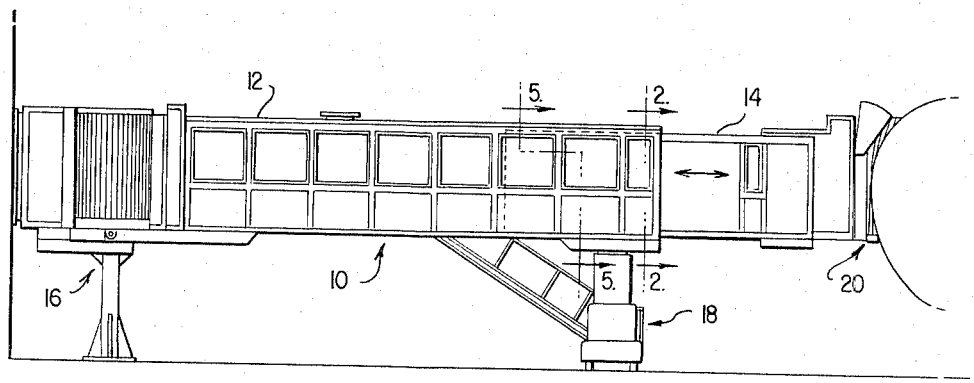
FIG. 1
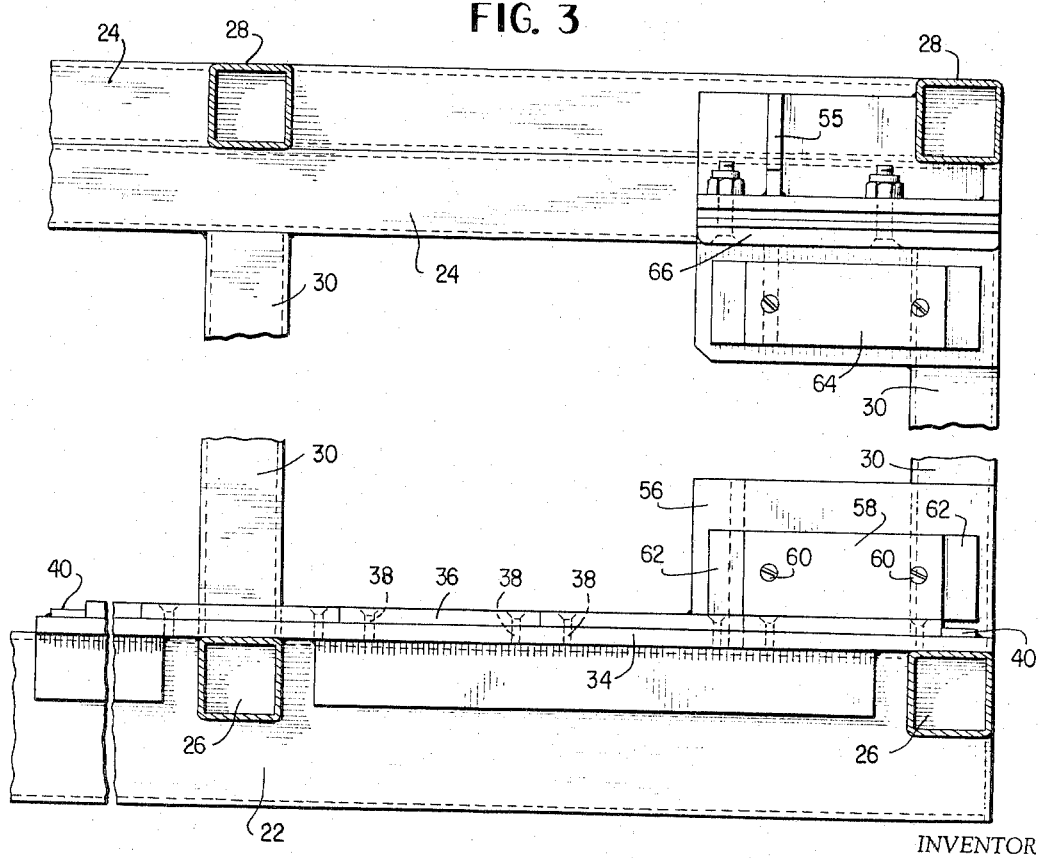
FIG. 3
FIG. 4
INVENTOR
ANDREW G. SEIPOS
BY *Shanley & O'Neil*
ATTORNEYS.

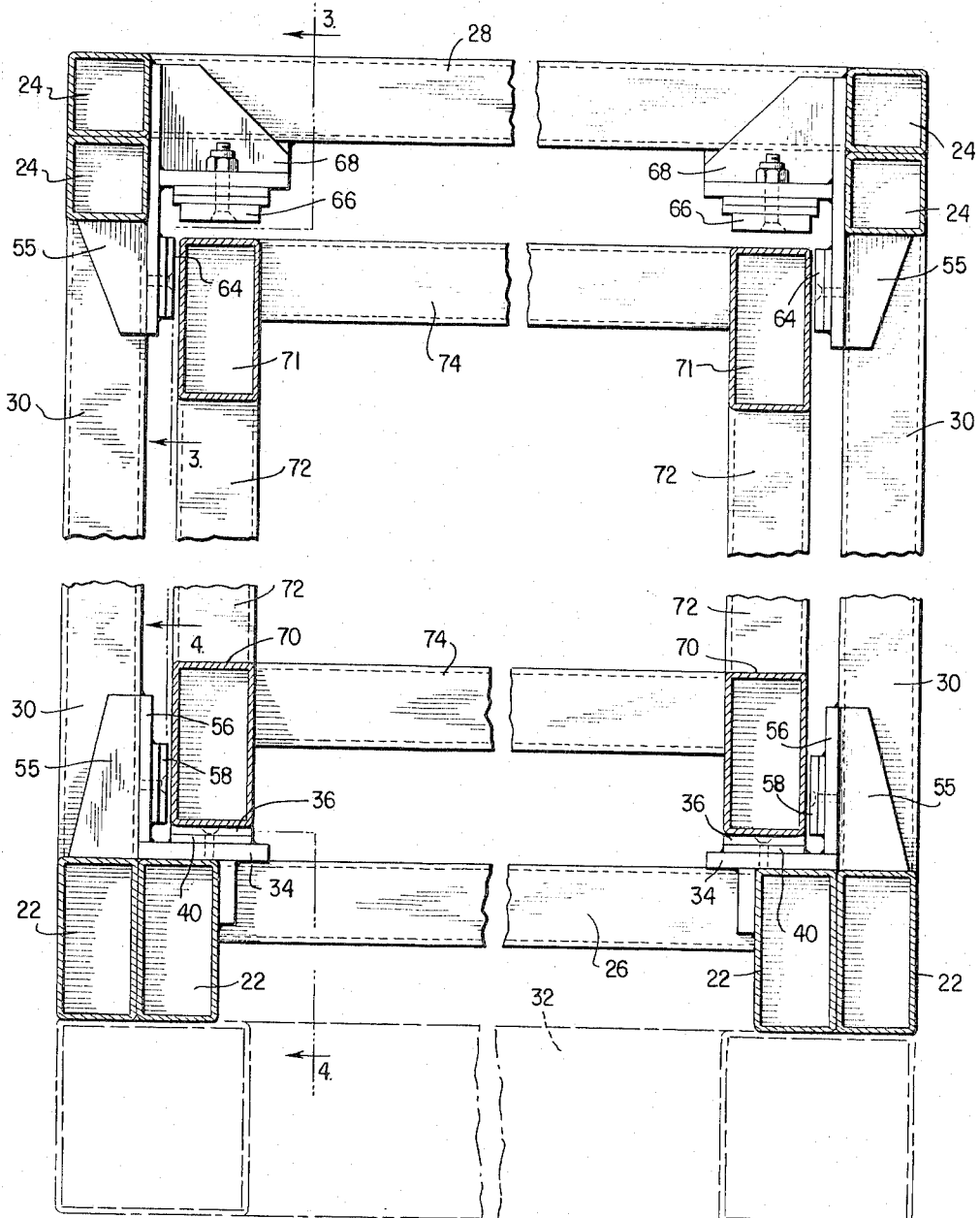

April 16, 1968 A. G. SEIPOS 3,377,638
CONVEYANCE LOADER
Filed Sept. 13, 1965 3 Sheets-Sheet 3
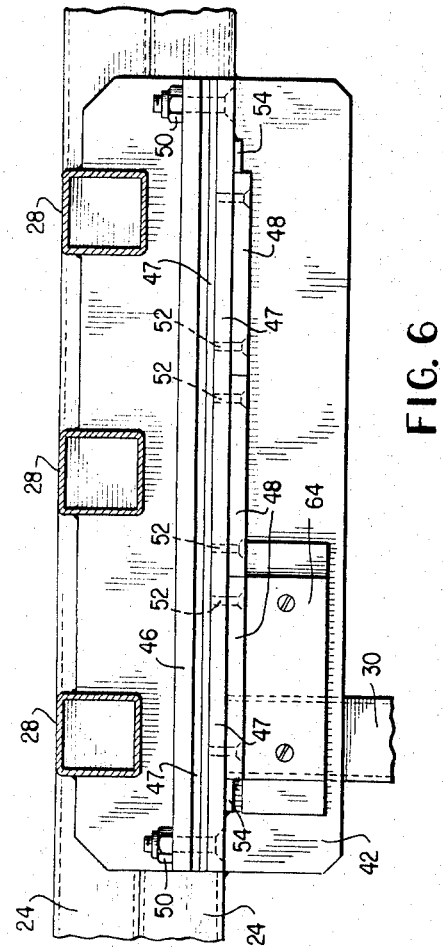
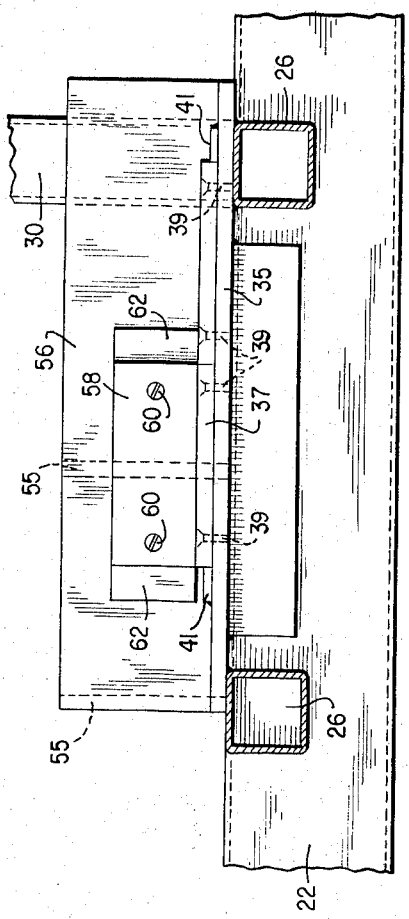
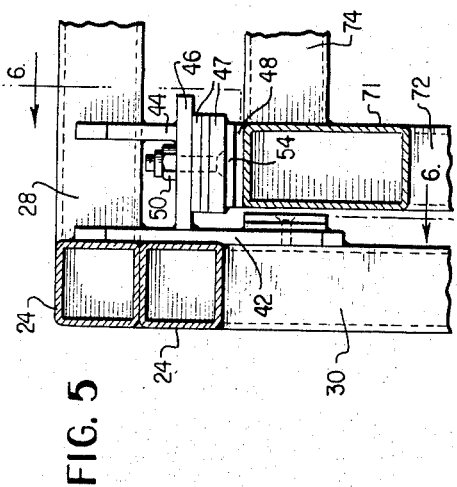
INVENTOR
ANDREW G. SEIPOS
BY Shanley & O'Neil
ATTORNEYS

3,377,638
CONVEYANCE LOADER
Andrew G. Seipos, Miami, Fla., assignor to Wollard Aircraft Service Equipment Inc., a corporation of Florida
Filed Sept. 13, 1965, Ser. No. 486,659
1 Claim. (Cl. 14—71)

ABSTRACT OF THE DISCLOSURE

A conveyance loader having telescoping passageway sections with contact between the telescoping passageway sections being through the intermediary of antifriction bearing members which are designed to coact with the principal frame members of the telescoped section, the area of contact of the antifriction bearing members and the frame members being as small as practicable consistent with adequate distribution of unit forces within the nondeforming strength of the framing members.

---

Examples of this general type of structure are illustrated in Good et al. U.S. Patent 2,688,761, Henyon U.S. Patent 2,700,169, Moore U.S. Patent 3,038,185, Golde et al. U.S. Patent 3,047,891, Der Yuen et al. U.S. Patent 3,060,471 and Bolton U.S. Patent 3,110,048. In all of these patents, the conveyance loader structures project out from a loading point toward a conveyance, usually an aircraft located at some considerable distance from the loading point, usually a terminal building. On the other hand, the need for over-lapping or telescoping passageways is also presented in that type of conveyance loading structure, such as shown in Der Yuen U.S. Patent 3,046,908, Lodjic et al. U.S. Patent 3,099,847 and Phillips U.S. Patent 3,121,243, where the conveyance, such as an aircraft, is brought in close to the building and only a short overlapping or telescoping relationship is present between the passageway sections.

In all of these types of conveyance loaders, herein, termed telescoping loaders, the mounting of the two telescoping passageway sections presents mechanical difficulties because of the stresses involved. As a result, expensive rollers and trackways have been depended upon in the past to provide the desired sliding arrangement while at the same time being able to absorb and distribute the resulting concentrated forces.

The present invention eliminates this expensive construction in telescoping loaders, both in respect to initial manufacturing costs and maintenance costs.

A full understanding of the present invention will be obtainable from the following detailed description taken in conjunction with the accompanying drawings wherein:

FIGURE 1 is a side elevational view of a representative telescoping loader embodying the present invention with a terminal building and a conveyance being diagrammatically illustrated;

FIGURE 2 is a view in cross section taken on the line 2—2 of FIGURE 1;

FIGURE 3 is a view partly in cross section and partly in elevation taken on the line 3—3 of FIGURE 2;

FIGURE 4 is a view partly in cross section and partly in elevation taken on the line 4—4 of FIGURE 2;

FIGURE 5 is a partial view in cross section taken on the line 5—5 of FIGURE 1;

FIGURE 6 is a view partly in cross section and partly in elevation taken on the line 6—6 of FIGURE 5; and FIGURE 7 is a view partly in cross section and partly in elevation taken on the line 7—7 of FIGURE 5.

Referring to FIGURE 1, the representative loader indicated generally by the reference numeral 10 could just as well be one of the forms illustrated in the above-mentioned patents wherein there are two or more telescoping sections and the ends of the loader are supported in different manners. The only important part of the loader illustrated at 10 is the telescoping relation ship between main passageway section 12 which is nearer the terminal building and extensible passageway section 14 which is farther from the terminal building or is at the conveyance end of the loader.

The pedestal and associated structure indicated generally at 16 can be of any suitable construction, for example such as that disclosed in copending patent application Ser. No. 326,795, filed Nov. 29, 1963, now U.S. Patent No. 3,263,254 by Joseph C. Wollard, John S. Slaney and Lester L. Preiss. The mobile and elevating support structure indicated generally at 18 can be of any suitable construction, for example such as that disclosed in copending patent applications Ser. Nos. 326,771 and 326,795, filed Nov. 29, 1963, now U.S. Patents Nos. 3,315,291 and 3,263,254, respectively, by Joseph C. Wollard, John S. Slaney and Lester L. Preiss. The conveyance engaging structure indicated generally at 20 can be of any desirable construction, for example that disclosed in copending patent application Ser. No. 412,876, filed Nov. 12, 1964, now U.S. Patent No. 3,310,823, by Lester L. Preiss.

Since the present invention is involved entirely with the passageway framework of a conveyance loader, the details in the drawings and this description are limited to that portion of the loader. Although, as pointed out above, more than one telescoping interrelationship can be present in a single loader and although the coacting parts can be interchanged in relationship, the specific embodiment of the present application will be described as illustrated in the drawings without repeated reference to these aspects.

The framework of passageway section 10 is made up of lower longitudinal tubular members 22 doubled for strength and upper longitudinal tubular frame members 24 doubled for strength with lower transverse tubular members 26, upper transverse tubular members 28 and finally vertical tubular frame members 30. Shown in phantom at 32 in FIGURE 2 is the support structure for connecting the outer end of the main passageway section 12 with the raising, lowering and lateral travel mobile unit 18.

Carried by structural plates 34 connected to the longitudinal members 22 are anti-friction bearing members 36 held in place on plates 34 by recessed bolts 38. These anti-friction members are shown sectional and blocked against longitudinal movement by abutments 40. The structure and composition of a specific form of anti-friction member 36, will be described below and is such as to coact with the surface of a conventionally finished sheet metal structural member so as to reduce to a practical minimum the friction between such a metal surface and the anti-friction member under the structural load pressures present. Since the total amount of friction present between two surfaces is proportional to the area of the surfaces, the area of anti-friction members 36 is kept to a minimum consistent with certain factors to be herein described. With the form of anti-friction member disclosed herein, the combined sections extend a longitudinal distance of about 2½ feet where the telescoping movement of passageway section 14 into and out of main passageway section 12 is 8 feet. All the anti-friction segments are about 2½ inches in width.

Rearwardly of the forward bearing structure illustrated in FIGURES 2 and 4 is a second bearing structure illustrated in FIGURES 5 and 7 wherein elements 35, 37, 39 and 41 corresponding to elements 34, 36, 38 and 40 appear. In respect to this more rearward bearing strucre, a one-foot length of bearing element suffices in the preferred embodiment.

As shown in FIGURES 5 and 6, vertically disposed plates 42 and 44 are connected to longitudinal frame members 24 and 28, respectively, so as to support horizontal structural plates 46 which are reinforced by plates 47 which in turn carry anti-friction members 48. The structural plates 46, 47 are held in place by bolts and nuts 50 and the anti-friction members are held in place on plates 47 by recessed bolts 52. In the preferred embodiment being described, the plurality of anti-friction member 48 segments at this location total a longitudinal dimension of about 1½ feet. As before, these members are blocked against longitudinal movement by abutments 54.

Supported by gusset plates 55 and upright members 30 at the upper and lower portion of the main passageway section as indicated in FIGURES 2, 4, 5 and 7 are structural plates 56 which support anti-friction members 58 held by recessed bolts 60 and blocked against longitudinal movement by abutments 62. The purpose of these anti-friction members is to oppose side thrust forces of the extension passageway 14 with minimum practical frictional resistance. Similar side thrust anti-friction members 64 are located at the upper parts of the main passageway section frame as indicated in FIGURES 2, 3, 5 and 7, side thrust anti-friction members 64 being supported and held in a manner similar to members 58.

Of course, the anti-friction structures described in connection with FIGURES 3–7 inclusive, are reproduced on both longitudinal sides of the framework of the main passageway section.

Located at the forward end of the framework of the main section passageway, as best seen in FIGURE 2, are anti-friction members 66 supported on built-up structures 68 formed from structural plates and gusset plates.

The framework of the extension passageway will now be described. Longitudinal tubular framework members 70, 70 form the lower longitudinal corners of the rectangular cross-sectional shaped framework and longitudinal tubular framework members 71, 71 form the upper longitudinal corners thereof with vertical tubular framework members 72 and horizontal tubular framework members 74. The upper surfaces of the top framework members 71 and the lower surfaces of the bottom longitudinal framework members 70 are in parallel planes in the preferred embodiment. These longitudinal tubular framework members 70 and 71 are dimensioned in cross section and formed from a gage of metal with the essential function of acting as beams for the framework of extension passageway 14. The external surfaces of the metal can be of conventional commercial finish without any expensive surface treatment and the sheet metal from which they are formed is of uniform gage throughout.

As will be evident from FIGURE 1, taken in conjunction with FIGURES 2 and 5, external surfaces of these longitudinal structural members 70 constitute continuous bearing surfaces which engage with and slide along the anti-friction bearing members 36, 37 and 48, with the entire weight of the extensible passageway section 14 being carried on bearings 36 and 37 in retracted position of the extensible passageway section and with the bearing member 48 acting in conjunction with bearing member 36 to oppose the force couple present when extension passageway 14 is extended so that its center of gravity is beyond the end of the main passageway section bearing member 36.

It will be noted that a gap is present between the surfaces of bearing members 66, 66 and the upper surfaces of framework members 71, 71. Thus there is normally no bearing engagement at these points but it can sometimes happen that a strong force will lift the outer end of extensible passageway section 14 and in such case bearing elements 66 will permit relative movement of the passageway sections despite such upward canted position of the extensible passageway section and without seizing or galling of the surfaces of the framework thereby brought into engagement.

Additionally, in respect to these bearing members 66, although bearing members 36 and 37 are positioned so as to support substantially all the weight of the extensible passageway 14 when passageway 14 is fully retracted, it is conceivable that an abnormal load on the loader could result in the extensible passageway 14 being canted upwardly with its outer end in contact with the top of main passageway 12 and in such case objectionable seizure or galling of the framework parts on initial outward movement of passageway 14 would be prevented.

It will be apparent that the bearing members can have other than flat shapes and be arranged in other than horizontal and vertical planes so as to achieve the desiderata of the present invention.

The anti-friction elements in the present combination may be formed of any desirable anti-friction bearing material which has the requisite strength for carrying the stresses involved over an area such that the forces involved will be distributed over an area of a longitudinal framework member 70 or 71, with the unit distribution of force being less than that which will permanently deform the walls of the framework member, even though these longitudinal framework members are not designed to take concentrated loads but are primarily designed as beams in the extensible passageway section framework. An example of material which will satisfactorily carry out the functions of the bearing members in the present invention is an oil impregnated porous bronze bearing material normally used for rotating shafts. A product on the market sold under the trademark BOST-BRONZ is eminently satisfactory. It is manufactured of metal powders by the powder metallurgy process in a manner such that uniformly distributed pores are provided between the metal particles which pores absorb oil by capillary action. As a result, this material has a self-contained oil supply which can be as high as 20% by volume and which will provide a uniform, protective film over the entire length of the bearing surface portions of longitudinal framework members 70 and 71. Other bearing materials can be used so long as the desired critical relationship is achieved, namely, an anti-friction sliding relationship with longitudinal framework members 70 and 71 with the smallest practicable (i.e., with conventional safety factors) bearing area in engagement with the framework members consistent with distributing the forces present over an area of the surface of the framework member which will not result in undesirable deformation of a longitudinal framework member at the point of engagement with a bearing member under the heaviest loading conditions expected in use.

Having described a specific embodiment, I hereby claim as my invention:

1. A conveyance loader comprising:
    (a) an elongated first passageway section having a framework,
    (b) an elongated second passageway section having a framework, the second elongated passageway section being telescopically received for longitudinal movement relative to and within the framework of the first passageway section with a portion of the first passageway section overlapping a portion of the second passageway section and a portion of the second passageway section protruding from one end of the first passageway section when the second passageway is in extended position relative to the first passageway section,
    (c) a plurality of bearing means carried by the first passageway section having relatively large area anti-friction surfaces of porous bearing material impregnated with an oily substance, each of the plurality of bearing surfaces lying in a plane parallel to the longitudinal axis of the first passageway section,
    (d) a first of said bearing means being carried contiguous to said one end of the first passageway section by the lower portion of the first passageway section framework on each side of the longitudinal axis of the first passageway section, (e) a second of said bearing means being carried at a point spaced inwardly from said one end of the first passageway section by the upper portion of the first passageway section framework on each side of the longitudinal axis of the first passageway section (one of the first and second said bearing means being positioned contiguous to said one end of the first passageway section and the other of the first and second said bearing means being positioned at a point spaced inwardly from said one end of the first passageway section), (f) a third of said bearing means being carried by the lower portion of the first passageway section on each side of the longitudinal axis of the first passageway section at a point intermediate the first bearing means and a plane normal to the longitudinal axis of the first passageway section passing through the second bearing means, (g) elongated lower and upper longitudinal metal framing members parallel to the longitudinal axis of the first passageway section forming the principal longitudinal framing members of the framework of the second passageway section, each such framing member being arranged in longitudinal alignment with the plurality of bearing means, each such framing member being of uniform tubular cross section throughout its length with a section modulus utilizing substantially the minimum amount of metal practicable for a load bearing beam in the framework of the second passageway section and without reinforcing against concentrated vertical crushing forces, (h) an elongated large area smooth surfaces(s) on each of the lower and upper longitudinal framing members of the second passageway section extending substantially the length thereof which is in sliding engagement with bearing means, (i) the large area of each antifriction surface of the bearing means being shaped to engage and engaging in sliding relation with an opposed equal sized area of each smooth surface of the lower and upper longitudinal framing members of the second passageway section during relative telescoping movement of the two passageway sections, the opposed area of each such smooth surface of the lower and upper longitudinal framing members of the second passageway section being greater only by a conventional safety factor than the minimum area of each such surface which will withstand the maximum bearing force exerted at any time on the longitudinal framing member involved without permanent deformation of the material of such framing member, (j) the passageway sections being so constructed and arranged that the engagement between the antifriction surfaces of the plurality of bearing means and the smooth surfaces of the elongated lower and upper longitudinal framing members constitutes substantially the only load transmitting engagement between the passageway sections in respect to vertical loads during relative telescoping movement, and (k) means supporting the conveyance loader at one end of one passageway section and at a point spaced along the length of the loader from such end thereby generating a force couple acting on the first and second said bearing means when the second passageway section is in fully extended position, (l) the location and spacing of the first and third bearing means being such as to support the entire weight of the second passageway section with the second passageway section in fully telescoped position and the location and spacing of the first and second bearing means being such as to support the entire weight of the second passageway section with the second passageway section in the fully extended position.

References Cited
UNITED STATES PATENTS

| | | |
|---|---|---|
| 2,167,609 | 7/1939 | Dolle. |
| 2,888,300 | 5/1959 | Curtis et al. _____ 308—3 |
| 2,944,468 | 7/1960 | Hazelton et al. _____ 90—48 |
| 3,184,772 | 5/1965 | Moore et al. _____ 14—71 |
| 3,263,253 | 8/1966 | Wollard et al. _____ 14—71 |

JACOB L. NACKENOFF, *Primary Examiner.*

UNITED STATES PATENT OFFICE
CERTIFICATE OF CORRECTION

Patent No. 3,377,638　　　　　　　　　　　　April 16, 1968

Andrew G. Seipos

It is certified that error appears in the above identified patent and that said Letters Patent are hereby corrected as shown below:

Column 5, line 10, beginning with "(one" cancel all to and including "section)" in line 15, same column 5; line 36, "surfaces(s)" should read -- surface --.

Signed and sealed this 19th day of August 1969.

(SEAL)
Attest:

Edward M. Fletcher, Jr.　　　　　　　WILLIAM E. SCHUYLER, JR.
Attesting Officer　　　　　　　　　　　Commissioner of Patents